United States Patent Office 3,366,680
Patented Jan. 30, 1968

3,366,680
PROCESS FOR PREPARING DODECANDIOIC ACID FROM CYCLODODECANE
Francesco Minisci and Giuseppe Belvedere, Milan, Remo Galli, Torricella Del Pizzo, and Adolfo Quilico, Milan, Italy, assignors to Montecatini Edison S.p.A.
No Drawing. Filed Oct. 1, 1962, Ser. No. 227,521
Claims priority, application Italy, Oct. 4, 1961, 17,966/61
6 Claims. (Cl. 260—533)

This invention relates to a process for preparing dodecandioic acid by oxidation of cyclododecane with nitrogen oxides.

Certain dicarboxylic acids, namely the higher homologues of adipic acid, are of special interest in the fields of polyamidic resins, plasticizers and lubricants. In view of this, attempts have been made to develop more econimical processes for preparation of these higher homologues.

In particular, dodecandioic acid is prepared from peroxidized compounds by decomposing cyclohexanone peroxide with ferrous salts, or by decomposing the peroxide of acetoacetic ester with ferrous salts in the presence of butadiene. However, the economic importance of these processes is limited because the yields are not very high and because they require use of sensitive substances, such as organic peroxides.

More recently developed catalytic processes, employing metalorganic compounds, have now made available compounds, such as cyclododecatriene and cyclododecane, which were previously obtainable with difficulty. These compounds are very good starting products for use in preparing dodecandioic acid.

In a copending U.S. patent application of the applicant Serial No. 156,501 filed on December 1, 1961, now U.S. Patent Number 2,596,662, a process is described in which cyclohexane is transformed into a mixture of adipic acid and nitrocyclohexane by treatment with nitrogen oxides in the presence of catalysts. The course of the reaction is greatly influenced by the $NO/NO_2$ ratio, the presence of NO favoring the formation of adipic acid. Conversely, the partial or total removal of NO considerably influences the reaction in the direction of formation of nitrocyclohexane. However, importance of the said process is limited in practice due to the danger of explosions, especially when carried out in the presence of oxygen and with high concentrations of nitrogen dioxide. The limited practical value of the process is also due to the low reaction rate, necessitating very long reaction times, namely up to 40–50 hours.

We have found surprisingly that cyclododecane can be transformed into dodecandioic acid by nitrogen oxides without encountering the danger of too violent a reaction, even at high concentrations of nitrogen oxides, and with good reaction rates, by adopting operating conditions completely different from those found necessary in the case of cyclohexane.

The process, according to the instant invention, is characterized in that the oxidation is carried out with monomeric or dimeric nitrogen dioxide, either in the presence or absence of NO. The latter, which is formed during the reaction by partial reduction of nitrogen dioxide, further reacts, transforming itself into $N_2$ and $N_2O$. This further reaction of nitrogen monoxide (NO) can be avoided by operating in the presence of oxygen, which transforms the monoxide into the dioxide, and thus reduces the total consumption of dioxide.

In any event, in distinction over what occurs in the case of cyclohexane, the presence of nitrogen monoxide does not determine the course of the reaction, in the desired direction, namely the obtainment of dodecandioic acid and not of nitrated products. But it is necessary that both monomeric and dimeric nitrogen dioxides be present. We have discovered that when the dimer is absent the reaction leads prevailingly to nitration products, whereas the reaction practically does not occur in the absence of the monomer.

Moreover, we have discovered that the reaction rate increases upon increasing the $NO_2$ concentration and the temperature, and that the yields of dodecandioic acid increases upon increasing the $N_2O_4$ concentration. It is therefore necessary to determine the right $NO_2/N_2O_4$ ratio, namely the one which produces high yields of dodecandioic acid and at the same time allows a practically acceptable reaction rate, it being necessary to realize said ratio by suitable adjusting the temperature and pressure.

Increase in temperature causes displacement of the equilibrium $N_2O_4 \rightleftarrows 2NO_2$ towards the monomer, the proportion of dissociated dioxide, under 1 atm., being 31% at 40° C., 50.4% at 60° C., 73.8% at 80° C., and practically 100% at 140° C. Increase in pressure has a contrary influence. Below 5 atm. the percentages of dissociated dioxide are 28.2% at 60° C., and 46.7% at 80° C.

We discovered that the optimum $NO_2/N_2O_4$ ratio, and optimum reaction conditions are obtained by operating in a nitrogen oxides-proof, pressure reactor while agitating at temperatures between 30° and 80° C., and employing a nitrogen dioxide concentration of 30–60%, by weight, with respect to the reaction mixture. Under these conditions the partial pressure of nitrogen dioxide reaches values comprised between 2 and 5 atm.

It is preferable to operate in the presence of catalysts based on silica gel and vanadium compounds, since the presence of these catalysts makes it possible to considerably reduce the formation of lower homologues of dodecandioic acid, and to markedly increase the yields of the said acid. The amounts of vanadium compounds to be used are of the order of 0.1–0.5% by weight with respect to cyclododecane, while silica gel is present in the proportion of 5–15%. The catalysts can be regenerated and reused.

The separation and the purification of raw dodecandioic acid according to our invention are simple. To separate dodecandioic acid it is sufficient to treat the reaction product with a solvent which dissolves the unreacted cyclododecane and the nonacid products of the reaction, and in which dodecandioic acid is insoluble. For this purpose, aliphatic and cycloaliphatic hydrocarbons, petroleum ether, ligroin, chloroform, carbon tetrachloride, etc. are very suitable. The raw dodecandioic acid is filtered off, and is crystallized out from 40–60% nitric acid.

The nitric acid has two functions. It acts as a very good crystallization solvent. Dodecandioic acid is very scarcely soluble in water, even in the warm. Nitric acid also transforms into dodecandioic acid the nitrogen-containing dodecandioic acids and the ω-cyan-undecanoic acid formed during the reaction and remaining in the insoluble fraction.

The solvent is then evaporated from the filtered solution, and the residue recycled after addition of an amount of cyclododecane equal to that transformed into dodecandioic acid.

In an alternative procedure, the reaction is carried out in solvents such as chloroform and carbon tetrachloride, which do not react with nitrogen oxides under the reaction conditions, and in which cyclododecane is soluble and dodecandioic acid is practically insoluble, the latter thus being directly separable from the reaction mixture.

The following examples are intended to illustrate preferred embodiments of the invention, without intent to thereby limit its scope.

Example 1

60 grams cyclododecane, 40 grams nitrogen dioxide, 5.7 grams silica gel and 0.3 gram ammonium metavanadate are heated in a glass tube placed in a closed 1500-cc. steel vessel provided with a shaking agitator. The glass tube is provided with upper holes so that the reaction liquid cannot escape during agitation. The temperature is kept at 51° C. for 19 hours. A further 40 grams of nitrogen dioxide and 20 grams of cyclododecane are then added, and the whole set-up is kept at 51° C. for 22 hours.

The nitrogen oxides still present are recovered by distillation, the reaction mixture being treated with petroleum ether and raw dodecandioic acid (46 g.) filtered off.

The ether solution is dried and evaporated; and to the residue 20 grams cyclododecane, 40 grams nitrogen dioxide, 5 grams silica gel and 0.3 grams ammonium metavanadate are added, and heating is repeated at 51° C. for 20 hours.

Raw dodecandioic acid is separated again by treatment with petroleum ether, whereupon the operation is repeated again, after addition of further 20 grams cyclododecane and 40 grams nitrogen dioxide to the residue.

From 120 grams starting cyclododecane, 110 grams raw dodecandioic acid are thus obtained, 27 grams of unreacted cyclododecane being recovered. The raw dodecandioic acid is purified by treatment with 50% nitric acid (30–40 grams of raw acid per 100 cc. of 50% nitric acid) by heating first at 60° C. for 30 minutes while agitating and then at the boiling point for 30 minutes. The raw product is completely dissolved with contemporaneous development of nitrogen oxides. Upon cooling it, dodecandioic acid crystallizes out, having a boiling point of 128–129° C.

Acidimetric equivalent: found 115, calculated for dodecandioic acid 115.

Example 2

40 grams cyclododecane, 30 grams nitrogen dioxide, 5 grams silica gel and 0.3 gram ammonium metavanadate are reacted in the apparatus described in the preceding example, at 50° C. for 15 hours.

The unreacted nitrogen oxides are recovered by distillation. The reaction mass is treated with petroleum ether, and the raw dodecandioic acid filtered off. The ether solution is dried and evaporated. Then 15 grams cyclododecane, 30 grams nitrogen dioxide, 15 grams silica gel and 0.3 gram of ammonium metavanadate are added to the residue, and the whole mixture reacted at 59° C. for a further 15 hours.

The separation of raw dodecandioic acid by means of petroleum ether is repeated, and the residue of the ether solution is recycled after addition of 20 grams cyclododecane, 30 grams nitrogen dioxide, 5 grams silica gel and 0.3 gram ammonium metavanadate.

From 75 grams of starting cyclododecane, 70 grams raw dodecandioic acid are obtained and 13 grams unreacted cyclododecane are recovered.

The purification of the raw acid is carried out as in Example 1, with 50% $HNO_3$.

We claim:

1. A process for preparing dodecandioic acid, comprising oxidizing cyclododecane with a mixture of monomeric and dimeric nitrogen dioxide at a temperature between 30° and 80° C. said nitrogen dioxide being present in proportions between 30 and 60% by weight of the reaction mixture and under a partial pressure between 2 and 5 atmospheres, in the presence of an ammonium metavanadate/silica gel catalyst.

2. A process according to claim 1, characterized in that the mixture also contains nitrogen monoxide.

3. A process according to claim 1, the catalyst being used in the weight proportions of 0.1 to 0.5% of ammonium metavanadate and 5 to 15% of silica gel, with respect to the reaction mixture.

4. A process for preparing dodecandioic acid, comprising oxidizing cyclododecane with a mixture of monomeric and dimeric nitrogen dioxide at a temperature between 30° and 80° C., the nitrogen dioxide being present in proportions between 30 and 60% by weight of the reaction mixture under a partial pressure of 2–5 atmospheres in the presence of an ammonium metavanadate/silica gel catalyst, and separating the raw dodecandioic acid from the reaction mixture by treatment with a solvent in which it is insoluble but which is capable of dissolving the unreacted cyclododecane and the non acid reaction products, the solvent being selected from the group consisting of petroleum ether, ligroin, chloroform and carbon tetrachloride.

5. A process for preparing dodecandioic acid, comprising oxidizing cyclododecane with a mixture of monomeric and dimeric nitrogen dioxide at a temperature between 30° and 80° C., the nitrogen dioxide being present in proportions between 30 and 60% by weight of the reaction mixture under a partial pressure of 2–5 atmospheres in the presence of an ammonium metavanadate/silica gel catalyst, and separating the raw dodecandioic acid from the reaction mixture by treatment with a solvent in which it is insoluble but which is capable of dissolving the unreacted cyclododecane and the nonacid reaction products, the solvent being selected from the group consisting of aliphatic and petroleum ether, ligroin, chloroform and carbon tetrachloride, the raw dodecandioic acid so separated by selective solubility being purified by crystallization from 40 to 60% $HNO_3$, the $HNO_3$ also transforming into dodecandioic acid the $\omega$-nitro-derivatives of dodecandioic acid and $\omega$-cyan-undecanoic acid present in the raw dodecandioic acid.

6. A process for preparing dodecandioic acid, comprising oxidizing cyclododecane with a mixture of monomeric and dimeric nitrogen dioxide, the reaction being carried out in an organic solvent which is inert in the reaction, and in which cyclododecane is soluble, and dodecandioic acid is sufficiently insoluble to directly separate from the reaction mixture, the reaction being carried out in the presence of oxygen gas, and at between about 30° and 80° C., the total monomeric and dimeric nitrogen dioxide being employed in proportions between 30% and 60% by weight of the reaction mixture under a partial pressure of 2–5 atmospheres, excluding the said organic solvent and in the presence of an ammonium metavanadate/silica gel catalyst.

References Cited

UNITED STATES PATENTS 2,465,984  3/1949  Doumani et al. _____ 260—537

FOREIGN PATENTS 797,464  7/1958  Great Britain.

LORRAINE A. WEINBERGER, *Primary Examiner.*

L. ZITVER, *Examiner.*

I. R. PELLMAN, S. B. WILLIAMS, D. E. STENZEL, *Assistant Examiners.*